United States Patent
Liukku et al.

(10) Patent No.: US 10,809,279 B2
(45) Date of Patent: *Oct. 20, 2020

(54) CAPACITIVE MICROELECTROMECHANICAL ACCELEROMETER

(71) Applicant: MURATA MANUFACTURING CO., LTD., Nagaokakyo-shi, Kyoto (JP)

(72) Inventors: Matti Liukku, Helsinki (FI); Ville-Pekka Rytkönen, Klaukkala (FI)

(73) Assignee: MURATA MANUFACTURING CO., LTD., Nagaokakyo-Shi, Kyoto (JP)

( * ) Notice: Subject to any disclaimer, the term of this patent is extended or adjusted under 35 U.S.C. 154(b) by 250 days.

This patent is subject to a terminal disclaimer.

(21) Appl. No.: 15/970,962

(22) Filed: May 4, 2018

(65) Prior Publication Data
US 2018/0321275 A1 Nov. 8, 2018

(30) Foreign Application Priority Data
May 8, 2017 (FI) ...................... 20175404

(51) Int. Cl.
*G01C 19/5712* (2012.01)
*G01P 15/125* (2006.01)
(Continued)

(52) U.S. Cl.
CPC ............ *G01P 15/125* (2013.01); *G01P 15/18* (2013.01); *G01P 21/00* (2013.01); *G01P 2015/0831* (2013.01)

(58) Field of Classification Search
CPC ............ G01C 19/5705; G01C 19/5712; G01C 25/00; G01C 25/005; G01P 1/00;
(Continued)

(56) References Cited

U.S. PATENT DOCUMENTS 5,488,864 A * 2/1996 Stephan ................ G01P 15/125
73/514.32
5,731,520 A 3/1998 Stevenson et al.
(Continued)

FOREIGN PATENT DOCUMENTS

EP 3014284 A1 5/2016
JP 2005-249454 A 9/2005

OTHER PUBLICATIONS

Finnish Search Report dated Dec. 22, 2017 corresponding to Finnish Patent Application No. 20175405.
(Continued)

*Primary Examiner* — Nguyen Q. Ha
(74) *Attorney, Agent, or Firm* — Squire Patton Boggs (US) LLP

(57) ABSTRACT

A micromechanical accelerometer comprises a sensor for measuring acceleration along a vertical axis perpendicular to a substrate plane, and an accelerometer package with at least one inner package plane adjacent and parallel to the substrate plane. The first sensor comprises a rotor which is mobile in relation to the substrate, a rotor suspender and one or more stators which are immobile in relation to the substrate. The rotor is a seesaw frame where longitudinal rotor bar comprise one or more first deflection electrodes, and second deflection electrodes are fixed to the inner package plane above or below each of the one or more first deflection electrodes, so that they overlap. The accelerometer can perform a self-test by applying a test voltage to at least one first deflection electrode and at least one second deflection electrode. A self-test response signal can be read with a measurement between rotor and stator electrodes.

14 Claims, 5 Drawing Sheets

(51) Int. Cl.
*G01P 15/18* (2013.01)
*G01P 21/00* (2006.01)
*G01P 15/08* (2006.01)

(58) Field of Classification Search
CPC ........ G01P 15/00; G01P 15/125; G01P 15/18; G01P 21/00; G01P 2015/0831; G01P 2015/0882
See application file for complete search history.

(56) References Cited

U.S. PATENT DOCUMENTS

| | | |
|---|---|---|
| 5,831,164 A | 11/1998 | Reddi et al. |
| 7,210,352 B2 | 5/2007 | Foster et al. |
| 7,610,809 B2 | 11/2009 | McNeil et al. |
| 2003/0106372 A1 | 6/2003 | Adams et al. |
| 2004/0261529 A1 | 12/2004 | Yoshida et al. |
| 2006/0277997 A1 | 12/2006 | Foster et al. |
| 2007/0119252 A1 | 5/2007 | Adams et al. |
| 2009/0107238 A1 | 4/2009 | Guo |
| 2010/0223998 A1 | 9/2010 | Ackerley et al. |
| 2011/0023606 A1 | 2/2011 | Burghardt et al. |
| 2013/0263662 A1* | 10/2013 | Tanaka .................. G01P 1/003 73/504.12 |
| 2014/0083190 A1* | 3/2014 | Kaack .................. G01P 15/125 73/514.14 |

OTHER PUBLICATIONS

Finnish Search Report dated Dec. 14, 2017 corresponding to Finnish Patent Application No. 20175404.

Aug. 15, 2018 Search Report issued in European Patent Application No. 18170557.

\* cited by examiner

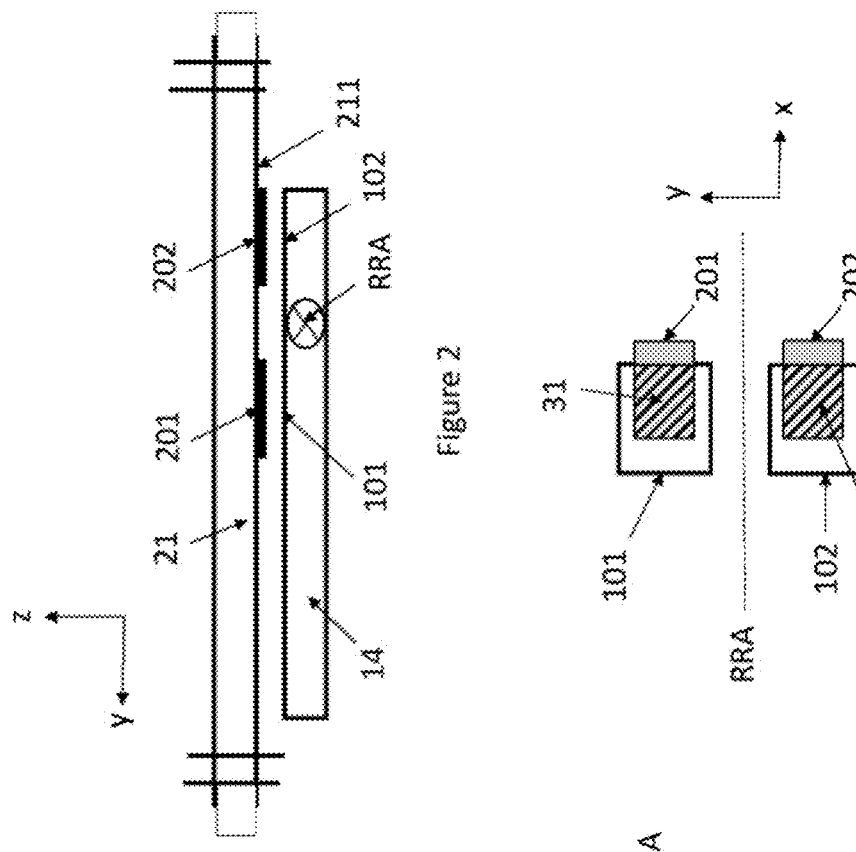
Figure 2
Figure 3
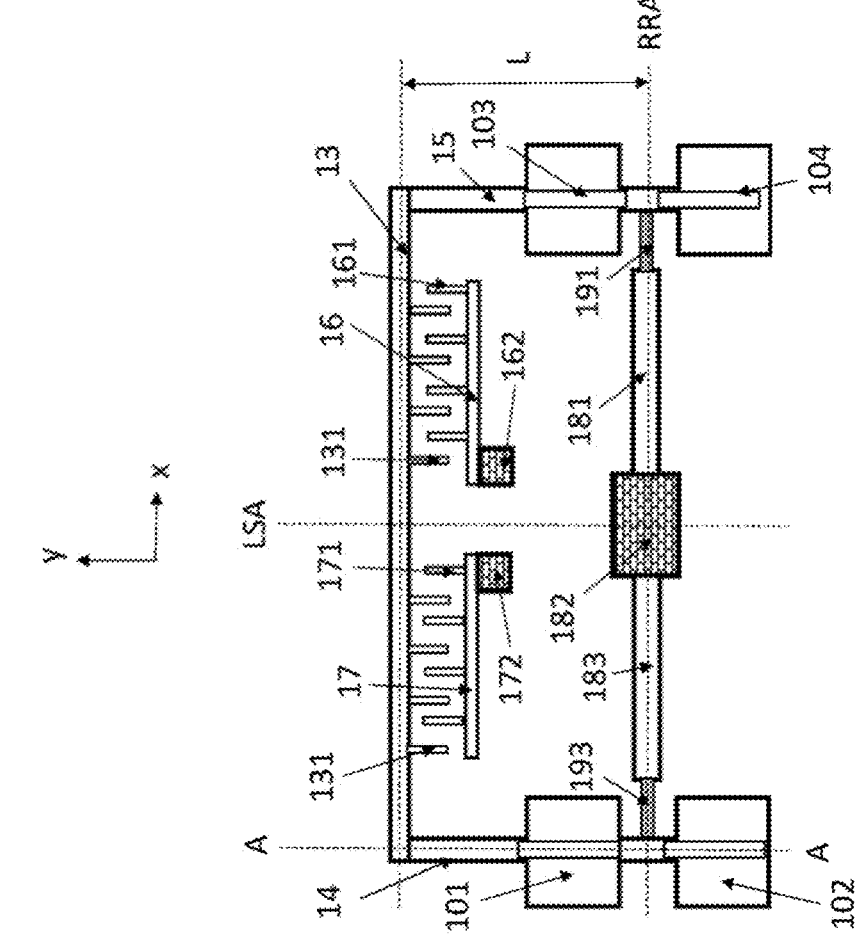
Figure 1

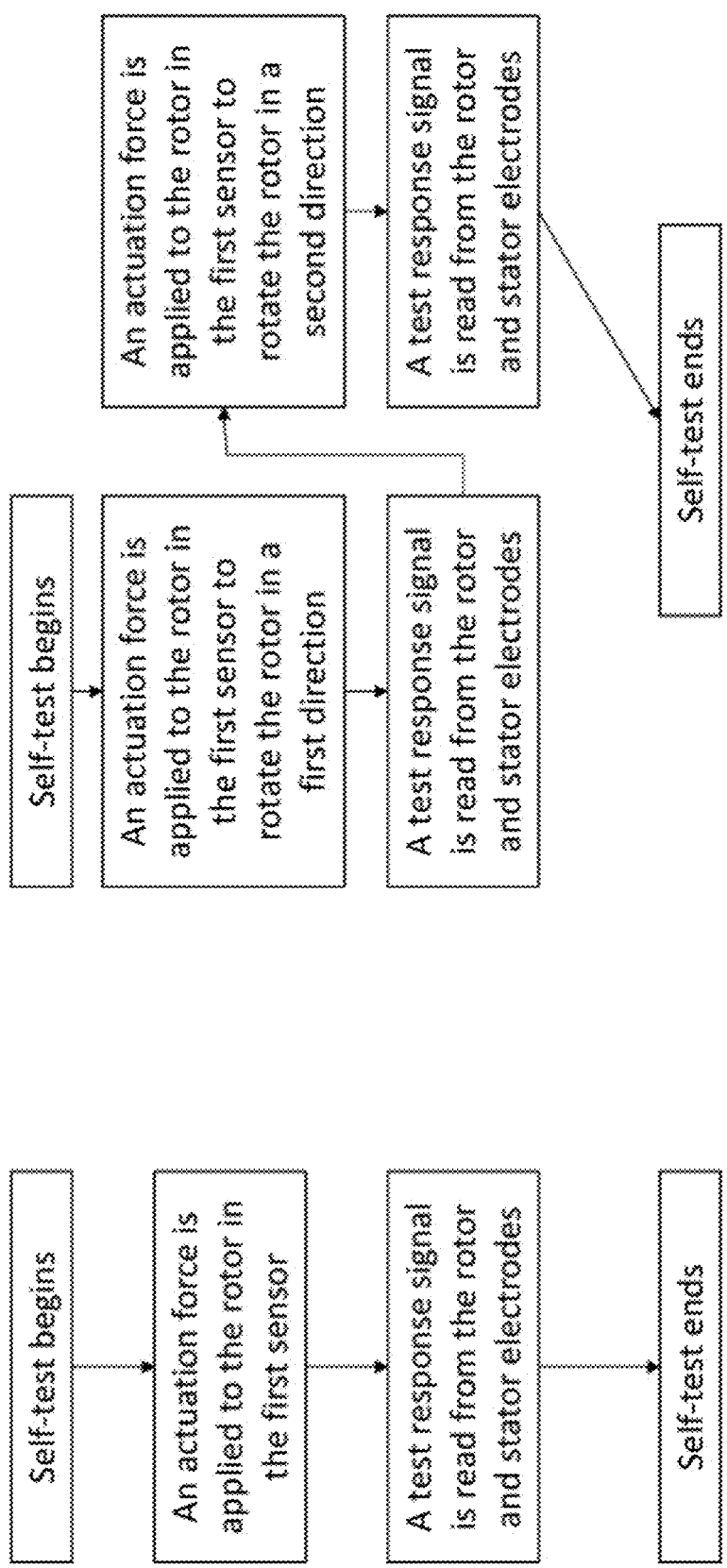

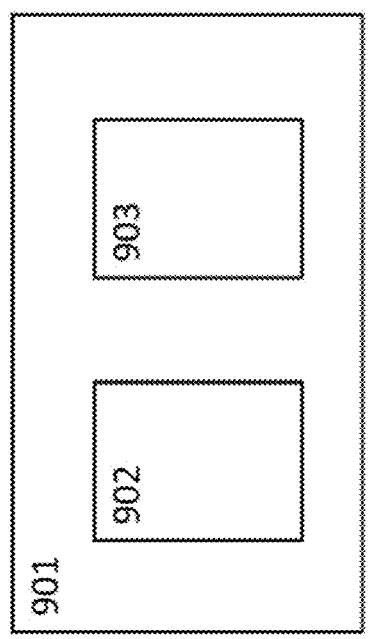

CAPACITIVE MICROELECTROMECHANICAL ACCELEROMETER

BACKGROUND

Field

This disclosure relates to capacitive accelerometers and to acceleration sensors with movable rotors which may rotate out of a substrate plane when the accelerometer undergoes movement with an acceleration component perpendicular to the substrate plane. Such sensors may be combined with two other sensors which measure acceleration in the substrate plane to form a three-axis accelerometer. Such accelerometers may be used in automotive applications, such as Electronic Stability Control (ESP/ESC), Antilock Braking (ABS), Electric Parking Brake (EPB), Hill Start Assistance (HSA), Electronically Controlled Suspension (ECS), headlight levelling or airbag deployment.

Description of the Related Art

Each capacitive sensor in a three-axis accelerometer may comprise a stator which is immobile in relation to the substrate and a rotor which is at least partly mobile in relation to the substrate. In this disclosure the terms "rotor" and "stator" both refer to interlinked micromechanical structures, such as bars or beams. The structures and their interconnections may be formed by etching a substrate, for example a silicon substrate.

In this disclosure, the terms "bar" and "beam" refer to elongated structures, for example made of silicon, which are rigid compared to more flexible structures which may be called "springs". Rigidity and flexibility are relative terms. Although the bars and beams which constitute a rotor will have some flexibility, they will still to a good approximation retain their mutual positions in relation to each other when the rotor moves, and only the springs from which the rotor is suspended will undergo significant flexible deformation due to the movement.

Rotors and stators typically comprise electrically conducting electrode areas on at least some of their interlinked structures to facilitate electrical measurements between the rotor and the stator.

A three-axis accelerometer typically comprises a substrate plane, which may be labelled the xy-plane. Stators may be fixed structures in the substrate plane. Acceleration sensors may be implemented in the substrate plane with rotors which undergo linear motion along an axis in the plane in response to accelerating movement along that axis. This disclosure focuses primarily on acceleration sensors where the rotor is implemented as a seesaw, so that it is attached to one or more torsion springs and undergoes rotational motion about a rotational axis defined by the torsion springs in response to accelerating movement which is not parallel to that axis.

If the rotor is implemented as a seesaw, its center of mass should not coincide with the rotational axis, because that would make it unresponsive to linear acceleration. A seesaw rotor should therefore be an unbalanced seesaw, at least to some extent. A seesaw rotor may be implemented as a completely one-sided seesaw, so that all parts of the rotor lie on one side of the rotational axis, which may be called the first side. More precisely, a seesaw rotor is one-sided if it is possible to draw a plane which crosses its rotation axis so that the entire rotor lies on one side of the plane. A rotor implemented as a seesaw may also be two-sided, so that some parts of the rotor lie on one side of the axis, which may be called the first side, and some parts lie on the opposite side of the axis, which may be called the second side. For a two-sided rotor, it is not possible to draw a plane which crosses its rotation axis so that the entire rotor lies on one side of the plane.

Document US2007119252 discloses a three-axis accelerometer comprising acceleration sensors for measuring acceleration in the substrate plane and for measuring out-of-plane acceleration.

Deflection tests can be used to verify that the inertial mass in an acceleration sensors moves, stops and releases normally after an external shock. Safety requirements increase the need for deflection tests which an accelerometer component can be programmed to perform autonomously. These self-tests require that certain electrodes on the rotor be used as deflection electrodes. When a deflection voltage signal of known magnitude is applied to the deflection electrodes, the rotor is deflected by a certain amount. A measurement performed with the normal measurement electrodes confirms whether or not the degree of deflection corresponded to the expected deflection at this deflection voltage, and that the rotor did not get stuck.

A disadvantage with the accelerometer presented in US2007119252 is that a self-test functionality cannot be easily implemented. The rotor/stator electrodes employed for signal readout do not provide enough electrical force for self-test deflection.

SUMMARY

An object of the present disclosure is to provide an apparatus for alleviating the above disadvantage.

The objects of the disclosure are achieved by an arrangement which is characterized by what is stated in the independent claims. The preferred embodiments of the disclosure are disclosed in the dependent claims.

The disclosure is based on the idea of implementing deflection electrodes on a z-axis acceleration sensor with a frame-shaped rotor. The deflection electrodes may be implemented close to the rotor rotation axis.

BRIEF DESCRIPTION OF THE DRAWINGS

In the following the disclosure will be described in greater detail by means of preferred embodiments with reference to the accompanying drawings, in which FIG. 1 illustrates a first sensor in a capacitive accelerometer.

FIG. 2 illustrates a part of the first sensor and the accelerometer package in the cross-section A-A from FIG. 1.

FIG. 3 illustrates a first example of areal overlap between first and second deflection electrodes.

FIG. 7 illustrates a method described in this disclosure.

FIG. 8 also illustrates a method described in this disclosure.

FIG. 9 illustrates a system comprising an accelerometer and a control unit.

Figure 5:
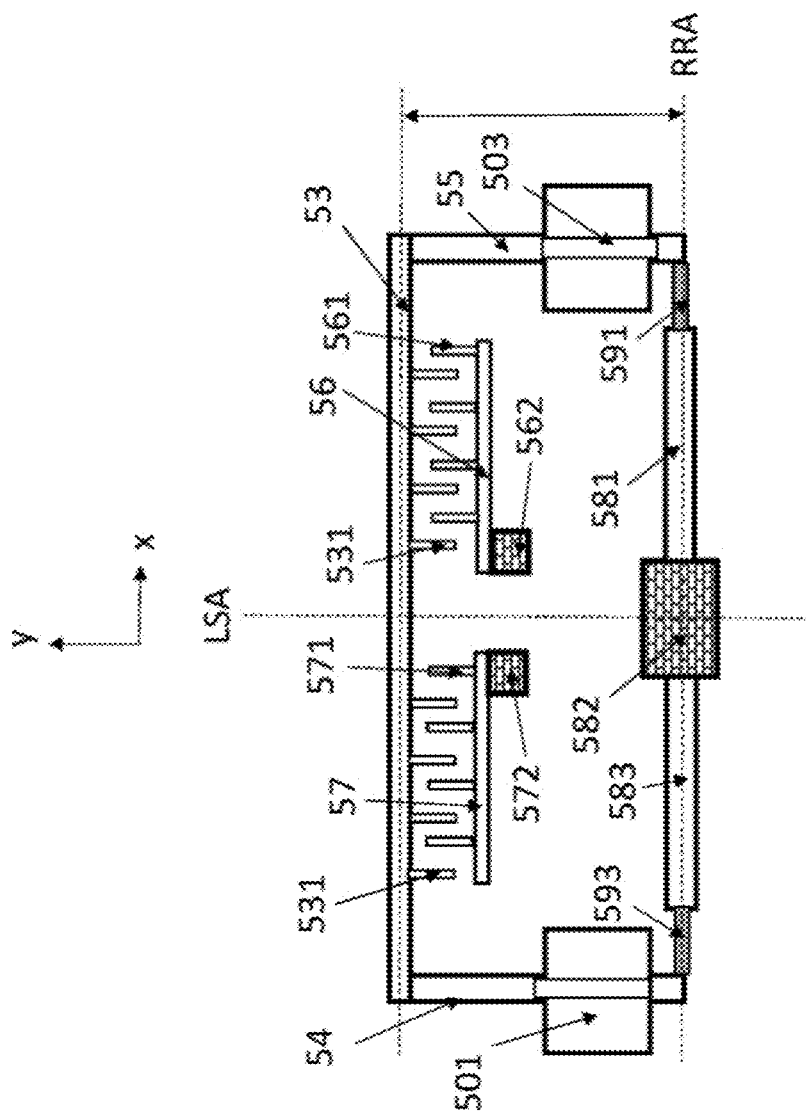
FIG. 5 illustrates a first sensor in a capacitive accelerometer.

The illustrations are schematic and have not been drawn to scale.

DETAILED DESCRIPTION

This disclosure describes a capacitive micromechanical accelerometer comprising a substrate which defines a substrate plane which extends in a transversal direction and a longitudinal direction, the transversal direction being perpendicular to the longitudinal direction, and a first sensor for measuring acceleration along a vertical axis perpendicular to the substrate plane, and an accelerometer package with at least one inner package plane which is adjacent and parallel to the substrate plane. The first sensor comprises a rotor which is mobile in relation to the substrate, a rotor suspender and one or more stators which are immobile in relation to the substrate. The rotor comprises one or more rotor electrodes and the one or more stators comprises one or more stator electrodes, the electrodes being configured for differential capacitive measurements. The rotor suspender comprises one or more transversal torsion springs attached to the rotor, wherein the torsion springs are aligned on a transversal rotor rotation axis.

The rotor is a seesaw frame comprising at least a transversal rotor bar, a first longitudinal rotor bar attached to the transversal rotor bar and a second longitudinal rotor bar attached to the transversal rotor bar. At least one longitudinal rotor bar comprises one or more first deflection electrodes, and a second deflection electrode is fixed to the inner package plane above and/or below each of the one or more first deflection electrodes, so that each of the one or more first deflection electrodes overlaps in an overlap area with the projection of the corresponding second deflection electrode in the substrate plane.

FIG. 1 illustrates schematically a first sensor in a capacitive accelerometer. The substrate plane corresponds in this disclosure to the xy-plane. In this disclosure the term "substrate" refers to the body from which the micromechanical structures which constitute the sensor have been prepared. When the structures are completed, the remaining parts of the substrate form a supporting body which surrounds the accelerometer. The substrate may, for example, be a silicon wafer. The micromechanical structures which constitute the sensor may be manufactured from the substrate by etching and coating methods. In other words, in this disclosure the term "substrate" refers to a thin substrate which forms the structure layer (or device layer) from which the microelectromechanical structures in the accelerometer are manufactured. This substrate typically requires structural support from a separate, much thicker handle wafer or support wafer.

A vertical z-axis may be defined to be perpendicular to the xy-plane. Some of the micromechanical components depicted in FIG. 1 may have the same thickness as the substrate, others may have a smaller thickness. In this disclosure, the substrate in its entire thickness constitutes the xy-plane, and the terms "above" and "below" refer to differences in z-coordinates from the surface of the substrate. In other words, an object "above" the substrate plane depicted in FIG. 1 may be interpreted to lie closer to the viewer than the top surface of the components which is illustrated in FIG. 1, while an object "below" the substrate plane may be interpreted to lie further away from the viewer than the bottom surface of the components depicted in FIG. 1. FIG. 2 illustrates an accelerometer package 21 above the device component 14, which is in the substrate plane.

The first sensor is configured for measuring acceleration in the direction of the z-axis, which will be referred to as the vertical axis in this disclosure, and which is perpendicular to the substrate plane. The first sensor comprises a rotor which comprises a transversal rotor bar 13 and two longitudinal rotor bars 14 and 15. Together, the transversal rotor bar 13 and the two longitudinal rotor bars 14 and 15 form a frame which may partly surround other components on the substrate plane. The rotor also comprises a set of rotor electrode fingers 131, which function as rotor electrodes. The number of fingers may be much larger, and the separations between fingers much smaller, than what is schematically illustrated in FIG. 1.

The sensor in FIG. 1 also comprises two stators with transversal stator bars 16 and 17 and corresponding sets of stator electrode fingers 161 and 171, which function as stator electrodes. The rotor and stator electrodes may be coated, and they may be vertically recessed from the top and/or bottom face of the substrate. As illustrated in FIG. 1, the frame-shaped rotor may partly surround the stators. The transversal stator bars 16 and 17 are fixed to the substrate at stator anchor points 162 and 172. The term "anchor point" refers in this disclosure to a region where objects such as bars may be firmly attached to the substrate.

The location and number of rotor and stator electrodes, as well as their geometry and mutual positioning, may be optimized for capacitive measurements in many ways depending on the intended measurement application.

The rotor is suspended from a rotor suspender, which may be anchored to one or more rotor anchor points. In this disclosure, the term "suspender" refers to a structure which comprises at least one or more torsion springs. If the one or more torsion springs is not connected directly to an anchor point, the suspender structure may also refer to bars or beams connected in a sequence extending from the rotor anchor point(s) to the torsion springs. The rotor turns when the torsion springs, which are transversal, are twisted torsionally. The optional bars or beams in the suspenders do not undergo a significant amount of bending or twisting. Instead, their primary function is displacement because they allow the rotor anchor points to be placed a certain distance from the torsion springs.

In this disclosure, the term "torsion spring" refers to a silicon structure with an aspect ratios which makes the torsion spring susceptible to torsional twisting about its lengthwise dimension. In this case, a "transversal" torsion spring means a spring whose lengthwise dimension is parallel with the x-axis in FIG. 1. Transversal torsion springs may be narrow in the y-direction to allow torsional twisting, but thick in the vertical z-direction to prevent translational movement out of the xy-plane. Alternatively, the transversal torsion springs may have a meandering shape in the xy-plane and be thick in the z-direction. Meandering springs can allow torsional twisting about the x-axis, for example, without necessarily being narrow in the direction of the y-axis.

FIG. 1 illustrates a sensor where the suspender comprises a first transversal rotor suspender bar 181 and a second transversal rotor suspender bar 183, and where the first transversal torsion spring 191 is attached to the end of the first transversal rotor suspender bar 181, and the second transversal torsion spring 193 is attached to the end of the second transversal rotor suspender bar 183. The transversal rotor suspender bars 181 and 183 are anchored to the rotor anchor point 182. Additional suspender bars may be added between the anchored suspender bars and the torsion springs if the torsion springs need to be displaced further from the suspender anchor point. These additional suspender bars may extend either in the transversal or the longitudinal direction.

The rotor, which comprises the transversal rotor bar 13 and the first and second longitudinal rotor bars 14 and 15, may be termed a "seesaw" because the transversal torsion springs 191 and 193 allow the rotor to pivot about the transversal rotor rotation axis (RRA) illustrated in FIG. 1. This axis is determined by the location of the torsion springs 191 and 193. The two torsion springs must be aligned on the same axis to facilitate the rotation or pivoting of the rotor.

When the accelerometer undergoes accelerating motion in a vertical direction, the rotor can rotate about the transversal rotor rotation axis and this movement can be detected with a differential capacitive measurement conducted between the rotor and stator electrodes described above.

The rotor illustrated in FIG. 1 may also be characterized as a two sided-seesaw because it extends to both sides of the transversal rotor rotation axis (which may be hereafter referred to as the RRA or as the transversal RRA). In other words, each longitudinal rotor bar 14 and 15 extends across the transversal rotor rotation axis, from a first side of the transversal rotor rotation axis to a second side.

This is illustrated from another angle in FIG. 2, which shows the cross-section A-A from FIG. 1. FIG. 2 shows the first longitudinal rotor bar 14 and the accelerometer package 21, with inner package plane 211 adjacent to the substrate plane. The longitudinal rotor bar 14 extends to both sides of the RRA. In other words, the rotor 14 extends both in a first direction and in a second direction from the RRA. These two directions are diametrically opposed, because the rotor forms a planar structure which rotates about the RRA. In FIG. 2, first longitudinal rotor bar lies in the substrate plane. The first direction is the positive y-direction and the second direction is the negative y-direction. When the accelerometer experiences acceleration in the direction of the z-axis, the rotor rotates about the RRA, out of the xy-plane. The stiffness of the torsion springs 191 and 193 should be configured to reach suitable movement with desired accelerations that are application-specific.

The package 21 extends beyond the first sensor to the left and right. The package surrounds the accelerometer on all sides, but the parts of the package which lie distant from the sensor are not relevant to this disclosure and are not illustrated in FIG. 2. The space between the package and the sensors is a sealed space, typically filled with an inert gas.

The rotor in FIG. 1 comprises symmetrical quadratic protrusion areas 101-104 in the longitudinal rotor bars 14 and 15. One or more of these protrusion areas may be connected to an external circuit via the torsion bars, the suspender bars and the anchor point. The protrusions do not necessarily need to be quadratic. They could have a rectangular form or any other form. The electrodes could in principle even be implemented on the longitudinal rotor bars without forming any protrusions on the bars at all, but the surface area of the narrow bar may by itself be insufficient to generate sufficient electrical force to displace the rotor appreciably.

Every first deflection electrode on the rotor requires an adjacent counter-electrode to generate the electrical force which deflects the rotor. This counter-electrode, which is referred to in this disclosure as a second deflection electrode, needs to be in close vertical proximity to the first deflection electrode. The second deflection electrode may be prepared on the accelerometer package and may be coated with an electrically conducting material.

FIG. 2 illustrates the location of the protrusion areas 101 and 102. Second deflection electrodes 201 and 202 may be manufactured on the inner package plane 211 either above or below protrusion areas 101 and 102. An apparatus where the second deflection electrodes have been manufactured above protrusion areas 101 and 102 is illustrated in FIG. 2. Second deflection electrodes 203 and 204 (not illustrated) may correspondingly be manufactured on the inner package plane either above or below protrusion areas 103 and 104, respectively.

The direction in which a deflection electrode pair can deflect the rotor depends on whether the second deflection electrode in this pair is located above or below the first deflection electrode, and on the location of the deflection electrode pair in relation to the rotor rotation axis. For example, the deflection electrode pair 101-201 in FIG. 2 can deflect the rotor clockwise from the illustrated perspective, whereas the deflection electrode pair 102-202 can deflect the rotor counter-clockwise from the illustrated perspective. If second deflection electrodes 201-202 were to be placed below the rotor instead (an alternative which is not illustrated), the deflection directions would be reversed.

The vertical gap between the first and second deflection electrodes may be between 0.5 µm and 5 µm. Separate stopping structures may be utilized to prevent the rotor from coming into contact with the package. Voltages applied to each pair of deflection electrodes (first pair 101+201, second pair 102+202) will create a torque which rotates the rotor around the RRA if the electric field is sufficiently strong. The electric field is determined by the applied voltage and by the areal overlap between a first deflection electrode and a second deflection electrode.

The first deflection electrodes do not need to have exactly the same sizes, areas or xy-positions as the second deflection electrodes. An electric field is generated wherever a first deflection electrode overlaps with the projection of a second deflection electrode in the substrate plane. The projection of a second deflection electrode in the substrate plane is the area which lies in the xy-plane directly beneath the second deflection electrode in question. The area where the first deflection electrode overlaps with the projection may be called an overlap area. The first deflection electrodes may be larger than the second deflection electrodes, or vice versa.

Figure 4:
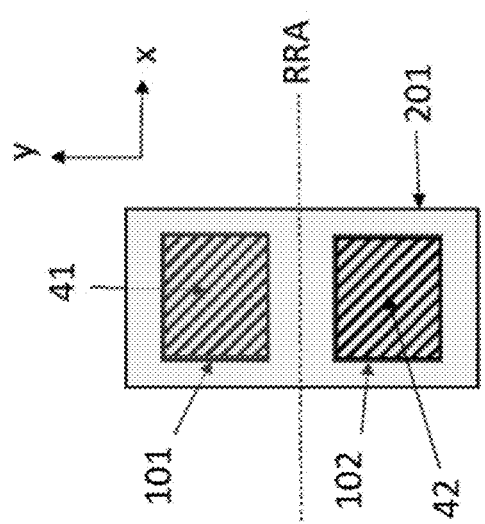
FIG. 4 illustrates a second example of areal overlap between first and second deflection electrodes.

FIG. 3 illustrates two first deflection electrodes and the projections of two second deflection electrodes in the substrate plane. The overlap area is illustrated with stripes. In the illustrated configuration, the first deflection electrodes 101 and 102 on the rotor are larger than the second deflection electrodes 201 and 202 on the package, and they overlap partially. The first overlap area is 31 and the second overlap area is 32. FIG. 4 illustrates a configuration where there is only one second deflection electrode 201 whose projection to the xy-plane covers both first deflection electrodes 101 and 102. Either of these first deflection electrodes 101 or 102 may be used to deflect the rotor, but they cannot both be used simultaneously. In this case the first overlap area 41, again illustrated with stripes, coincides with first deflection electrode 101, and the second overlap area 42 coincides with first deflection electrode 102.

In a first embodiment, illustrated in FIG. 1, the rotor is a two-sided seesaw frame which means that first and second longitudinal rotor bars 14 and 15 extend across the transversal rotor rotation axis (RRA), from one side of the RRA to a second side of the RRA. Deflection electrodes can be formed on one or more of the protrusion areas 101-104. In other words, some of the protrusion areas 101-104 may be connected to a voltage source, so that they can function as first deflection electrodes, while others may have no electrical connection. Second deflection electrodes 201-204 may be prepared on the inner package plane above the protrusion areas 101-104 which function as first deflection electrodes. A first deflection electrode and a second deflection electrode together constitute a deflection electrode pair. The first deflection electrodes may all be connected to the same potential, while second deflection electrodes may be connected to different potentials.

The first deflection electrodes may, for example, consist of one first deflection electrode on either of the longitudinal rotor bars 14 or 15. This lone first deflection electrode may be placed on the same side of the RRA as the transversal rotor bar 13. In other words, the first deflection electrode may be prepared on either protrusion area 101 or on protrusion area 103. Alternatively, the lone first deflection electrode may be placed on the opposite side of the RRA compared to the transversal rotor bar 13. In this case, the first deflection electrode is prepared either on protrusion area 102 or on protrusion area 104.

Even when only one of the protrusion areas 101, 102, 103 and 104 is used as a deflection electrode, the other protrusion areas may still be present in the rotor, as in FIG. 1. The other protrusion areas may be used for other purposes, such as damping. Alternatively, if only one of the protrusion areas is used as a deflection electrode, the other protrusion may be removed so that the longitudinal rotor bars 14 and 15 are narrow everywhere, except for the protrusion area on one of the longitudinal bars which is used as a deflection electrode.

The benefit of using only one pair of deflection electrodes (a first deflection electrode in the substrate plane and the corresponding second deflection electrode on the inner package plane) is that the electrical connections to the electrode pair are easy to make, less electrical routing is needed and the size of the element can be smaller, which reduces the cost of the element. Since the electrical force is applied only to one side of the rotor, the rotor experiences a torque about its longitudinal symmetry axis (LSA, illustrated in FIG. 1) when it is deflected. The rotor suspender can be made robust against this disturbance so that it effectively prevents the rotor from rotating or tilting about the LSA, while allowing it to rotate about the transversal RRA.

The first deflection electrodes may, for example, consist of two first deflection electrode on either of the longitudinal rotor bars 14 or 15. In other words, the first deflection electrodes may be prepared by making electrical connections to protrusion areas 101 and 102, for example, or alternatively to protrusion areas 103 and 104. Corresponding second deflection electrodes may be prepared on the inner package plane, to create deflection electrode pairs. The deflection electrode pair on a first side of the RRA may be used to rotate the rotor in a first direction about the RRA, while the deflection electrode pair on a second side of the RRA may be used to rotate the rotor in a second direction about the RRA, the first direction being opposite to the second.

Alternatively, the first deflection electrodes may consist of one first deflection electrode on the first longitudinal rotor bar 14 and one first deflection electrode on the second longitudinal rotor bar 15. These first deflection electrodes may, for example, be prepared on protrusion areas 101 and 103. Corresponding second deflection electrodes may be prepared on the inner package plane, to create deflection electrode pairs. The deflecting force can then be applied to the rotor symmetrically and simultaneously, on both sides of the LSA. The protrusion electrodes selected for the deflection electrodes may also be 101 and 104, or 102 and 103, so that one of the first deflection electrodes is on a first side of the transversal rotor rotation axis, while the other is on the second side of the transversal rotor rotation axis.

All electrodes, whether they are used for deflection or not, can be connected to ground potential in their normal operation mode. When electrodes are symmetrically placed on both sides of the RRA, they do not produce electric force that would tilt the mass even though ground potential is not the same as the potential to which the rotor mass is connected. All electrode pairs that consist of materials with different work functions experience electric potential difference between the materials. This potential difference is often called built-in bias voltage. As built-in bias voltage is always present and can also drift during the lifetime of the element, it is important that electrodes are symmetrically placed on both sides of the RRA. Built-in bias voltage is summed together with the external potential difference of the rotor mass and electrode in the same electrode pair. When electrodes on different sides of the RRA are designed to be close to each other, the changes due to package stresses or temperature change in electrode gap inside electrode pair are likely to follow each other better. Also, as built-in potential voltage is effected by material surface chemistry, the changes in electrode pairs on both sides of the RRA are likely to be more similar if the distance between electrode pairs is small. This way the offset error produced by the electrodes is minimized.

There may be two or more protrusion areas on either the first longitudinal rotor bar 14 and/or on the second longitudinal rotor bar 15, on either side of the transversal rotor rotation axis. Increasing the number of deflection electrode pairs increases the electrical force which can be imparted to the rotor when it is deflected. This increases the deflection amplitude. The deflection amplitude can also be increased by increasing the total overlap area of the deflection electrodes, or by increasing the deflection voltage which is applied to the electrodes.

One way to utilize multiple deflection electrodes is that the first deflection electrodes may consist of two first deflection electrodes on the first longitudinal rotor bar 14, for example on protrusion areas 101 and 102, and two first deflection electrodes on the second longitudinal rotor bar 15, for example on protrusion areas 103 and 104, paired with corresponding second deflection electrodes prepared on the inner package plane. At least one of the first deflection electrodes may be located on a first side of the transversal rotor rotation axis, and at least one of them may be located on a second side of the transversal rotor rotation axis.

Alternatively, the first deflection electrodes may consist of two first deflection electrodes on either the first or the second longitudinal rotor bar 14 or 15, for example on protrusion areas 101 and 102, or on protrusion areas 103 and 104, so that one first deflection electrode is on a first side of the transversal rotor rotation axis, while the other is on a second side of the transversal rotor rotation axis, as illustrated in FIG. 1. Corresponding second deflection electrodes may be prepared on the inner package plane to form one deflection electrode pair on each side of the RRA.

Alternatively, the first deflection electrodes may consist of one first deflection electrode on the first longitudinal rotor bar 14, and one first deflection electrode on the second longitudinal rotor bar 15. One of these first deflection electrodes may be on a first side of the transversal rotor rotation axis, and the other may be on a second side of the transversal rotor rotation axis. In other words, one first deflection electrode may be formed on protrusion area 101, and the other on protrusion area 104. Or one first deflection electrode may be formed on protrusion area 102, and the other on protrusion area 103. As before, corresponding second deflection electrodes may be prepared on the inner package plane to form one deflection electrode pair on each side of the RRA and on each side of the longitudinal symmetry axis (LSA).

Any of the first deflection electrode configurations described above can be used in any embodiment described in this disclosure where the rotor is a two-sided seesaw frame.

When one pair of deflection electrodes is present on both the first and the second sides of the transversal rotor rotation axis, the pair which is on the first side of the axis may be used to deflect the rotor in a first direction about the axis, and the pair which is on the second side of the rotor rotation axis may be used to deflect the rotor in a second direction about the axis. The first direction may be clockwise about the transversal rotor rotation axis and the second may be counter-clockwise.

In a second embodiment, illustrated in FIG. 5, the rotor is a one-sided seesaw frame. In FIG. 5, reference numbers 53-57, 501, 503, 531, 561-562, 571-572, 582, 591 and 593 indicate the same components as reference numbers 13-17, 101, 103, 131, 161-162, 171-172, 182, 191 and 193, respectively, in FIG. 1. First and second longitudinal rotor bars 54 and 55 extend to the transversal rotor rotation axis, but not across it. Deflection electrodes can be formed on one or both of the protrusion areas 501 and 503. As in the first embodiment, the first deflection electrodes may consist of one first deflection electrode on the first longitudinal rotor bar, paired with a corresponding second deflection electrode prepared on the inner package plane. This facilitates easy contacting.

Alternatively, the first deflection electrodes may consist of one first deflection electrode on the first longitudinal rotor bar and one first deflection electrode on the second longitudinal rotor bar, each paired with a corresponding second deflection electrode prepared on the inner package plane. In other words, there may be one deflection electrode pair on each side of the longitudinal symmetry axis (LSA).

There may be one second deflection electrode in the inner package plane above a first deflection electrode, and another second deflection electrode in the inner package plane below the same first deflection electrode. One of the second deflection electrodes may be used for deflecting the rotor in a first direction about the RRA, while the other one may be used for deflecting the rotor a second direction about the RRA. The first direction may be clockwise and the second direction counter-clockwise. The first deflection electrode mentioned in other embodiments of this disclosure may also be paired with two second deflection electrodes, one of them being above the first deflection electrode and while the other one is below the second deflection electrode.

Figure 6:
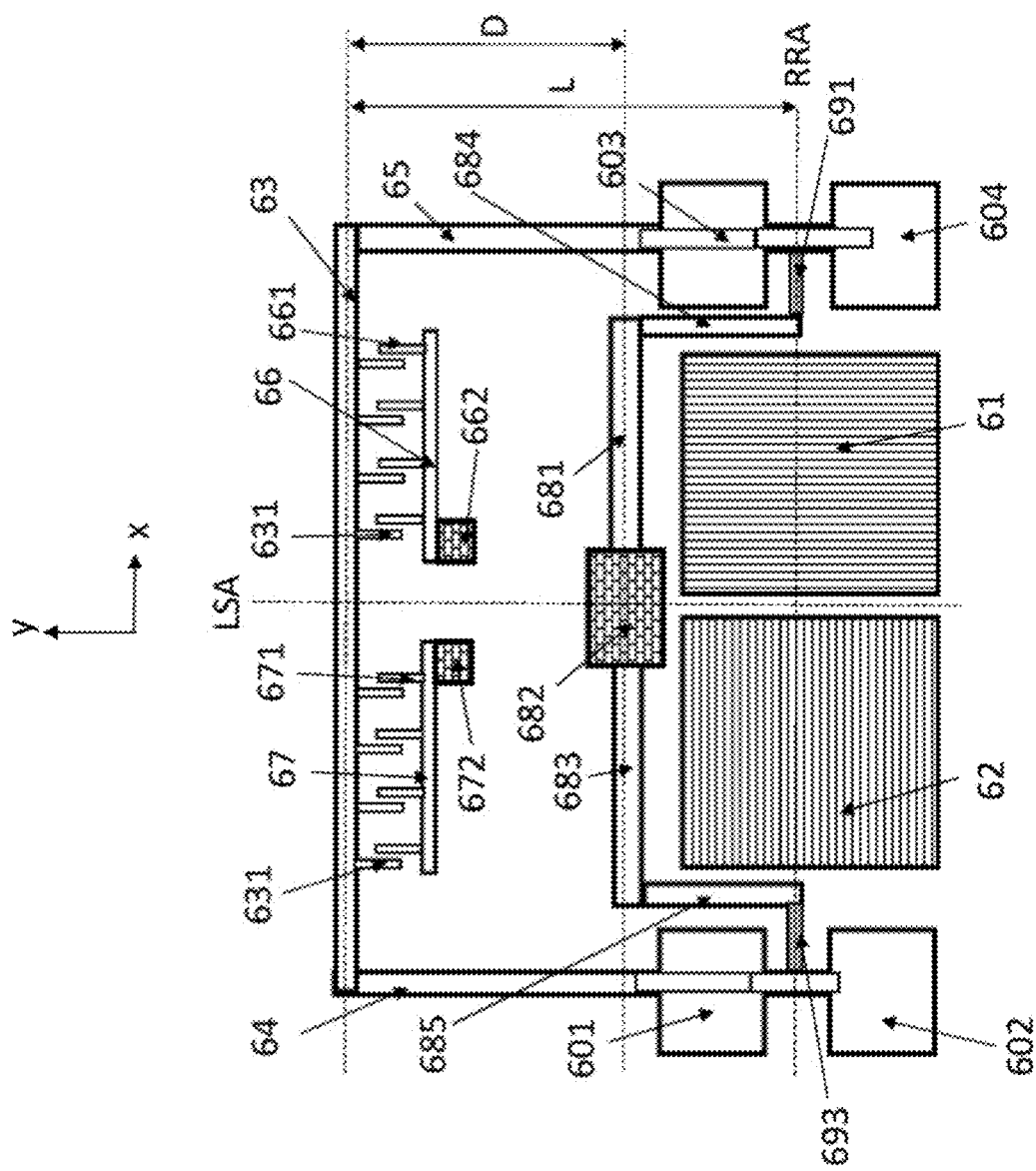
FIG. 6 illustrates an embodiment where the accelerometer also includes second and third sensors.

A three-axis accelerometer may contain, in addition to the first sensor described above, two other sensors for measuring acceleration in the xy-plane. FIG. 6 illustrates a three-axis accelerometer which contains a second sensor 61 and a third sensor 62. In FIG. 6, reference numbers 63-67, 601-604, 631, 661-662, 671-672, 682, 691 and 693, which all relate to the first sensor, indicate the same components as reference numbers 13-17, 101-104, 131, 161-162, 171-172, 182, 191 and 193, respectively, in FIG. 1.

The second sensor 61 may be configured to measure acceleration in the direction of the x-axis, which is referred to as the transversal axis in this disclosure. The second sensor may be a capacitive micromechanical acceleration sensor. The third sensor 62 may be configured to measure acceleration in the direction of the y-axis, which is referred to as the longitudinal axis in this disclosure. The transversal axis is orthogonal to the longitudinal axis. The third sensor may be a capacitive micromechanical acceleration sensor. The second and third sensors may be any applicable planar sensor known from the prior art, suitable for measuring acceleration in one direction.

The three-axis accelerometer can be produced on a small area in the substrate plane if the frame-shaped rotor in the first sensor partly surrounds the second and third sensors. In this disclosure, "the rotor partly surrounds the sensor" means that three sides of each rectangular sensor 61 and 62 face towards a part of the rotor. The upper sides of the sensors in FIG. 6 face the transversal rotor bar 63, the left sides face the first longitudinal rotor bar 64, and the right sides face the second longitudinal rotor bar 65.

In addition to consumed area, other design consideration pertaining to the first sensor include the distance from the transversal rotor rotation axis to the measurement electrodes on the rotor and stator electrodes. The longer the distance, the greater the displacement of the rotor electrodes in relation to the stator electrodes, and the stronger the capacitive signal. In FIG. 6 the rotor electrode fingers 631 are attached only to the transversal rotor bar 63, so the distance between the electrodes and the rotor rotation axis can be represented by the distance L from the transversal rotor bar to the rotor rotation axis. The same distance optimization applies even if the rotor electrode fingers would be attached somewhere else on the rotor.

It is often beneficial to keep the rotor anchors and stator anchors of the first sensor fairly close to each other. Mechanical stresses will then move the rotor and stator approximately in the same way, and no error signal is produced in the differential capacitive measurement between the rotor and stator. The error signal is also smaller if the anchors are close to the transversal rotor bar where the finger electrodes are located. Furthermore, when the first and second torsion bars are far from each other on the rotor rotation axis, parasitic resonances move to higher frequencies.

In the accelerometer illustrated in FIG. 6, the rotor suspender in the first sensor comprises a first transversal rotor suspender bar 681 and a second transversal rotor suspender bar 683, both of which are attached from one end to the rotor anchor point 682. The rotor suspender also comprises a first longitudinal displacement bar 684, attached to the first transversal rotor suspender 681. The first transversal torsion spring 691 is attached to the other end of the first longitudinal displacement bar 684, as illustrated. The rotor suspender also comprises a second longitudinal displacement bar 685, attached to the second transversal rotor suspender 683. The second transversal torsion spring 693 is attached to the other end of the second longitudinal displacement bar 685.

Both longitudinal displacement bars 684 and 685 extend from the transversal rotor suspenders 681 and 683 in a direction which is away from the transversal rotor bar 63. The transversal rotor rotation axis (RRA) is thereby placed further away from the transversal rotor bar 63 than the transversal line which crosses the rotor anchor point 682. In other words, the distance L is greater than the distance D illustrated in FIG. 6. This rotor suspender configuration thereby allows the rotor anchor points 662, 672 and 682 to be placed close to each other, and it allows the distance L to be relatively long, while still keeping the total area of the accelerometer relatively small because the second and third sensor 61 and 62 are partly surrounded by the rotor and the rotor suspender.

As before, the first deflection electrodes may consist of two first deflection electrodes on either the first or the second longitudinal rotor bar 64 or 65, for example on protrusion areas 601 and 602, or on protrusion areas 603 and 604, so that one first deflection electrode is on a first side of the transversal rotor rotation axis, while the other is on a second side of the transversal rotor rotation axis. Corresponding second deflection electrodes may be prepared on the inner package plane to form a deflection electrode pair on each side of the RRA. The first deflection electrodes may also consist of two first deflection electrodes on both the first or the second longitudinal rotor bars 64 and 65, so that all four protrusion areas 601-604 are utilized as deflection electrodes. With corresponding second deflection electrodes, they form two deflection electrode pairs on each side of the RRA. One pair of deflection electrodes on the first side of the rotor rotation axis may be used to deflect the rotor in a first direction about the axis, and another pair on the second side of the rotor rotation axis may be used to deflect the rotor in a second direction about the axis.

A self-test may be performed in any of the accelerometers described above by generating an actuation force on the rotor in the first sensor by applying a test voltage to at least one first deflection electrode and the corresponding second deflection electrode. A self-test may include a first deflection which rotates the rotor in a first direction about the rotor rotation axis, followed by a second deflection which rotates the rotor in a second direction about the rotor rotation axis. A test response signal can be read with a capacitive measurement from the rotor and stator electrodes, and the response can be compared to tabulated calibration values compiled before the accelerometer was put to use. The calibration values may include intervals with threshold limits.

The self-test may be performed by a control element which configured to control the accelerometer. The control element may comprise a processor and a memory unit and electric control means connected to the accelerometer. The control element may be configured to perform self-tests autonomously at regular intervals, and to generate an error code if the measured self-test response falls outside of the threshold limits.

The steps of one method, where the actuation force is applied once, are illustrated in FIG. 7. The steps of another method, where the actuating force is applied twice to rotate the rotor in two different directions, are illustrated in FIG. 8. An accelerometer system 901 comprising an accelerometer 902 and a control element 903 is schematically illustrated in FIG. 9.

The protrusion areas 601-604 on the first and second longitudinal rotor bars 64 and 65 may also function as first damping plates which, together with either the second deflection electrodes on the inner package plane, or with second damping plates prepared on the inner package plane only for damping purposes, may be configured to damp vibrations in the movement of the rotor. The surface area of the narrow bar is by itself insufficient to generate a tangible damping effect.

In other words, regardless of whether the protrusion areas 601-604 are used as deflection electrodes, they may be used as damping plates. The first and second longitudinal rotor bars may comprise at least two first damping plates, and second damping plates may be fixed to the inner package plane above and/or below each of the one or more first damping plates.

The first damping plates do not need to have exactly the same sizes, areas or xy-positions as the second damping plates. Damping takes place wherever a first damping plate overlaps with the projection of a second damping plate in the substrate plane, forming an overlap area in the same manner as the deflection electrodes illustrated in FIGS. 3 and 4.

The damping effect may be achieved by configuring at least one overlap area on each side of the transversal rotor rotation axis. The first and second overlap areas may be arranged symmetrically in relation to the rotor rotation axis. One form of symmetry is when all pairs of first and second overlap areas, on first and second sides of the rotor rotation axis, share the same shape, area and distance from the rotor rotation, as they do case in both FIGS. 3 and 4. The first and second overlap areas are in this case plane-symmetric in relation to the vertical plane where the transversal rotor rotation axis lies.

Symmetry in relation to the rotor rotation axis can also be understood in a less restricted way. The first and second overlap areas can be considered symmetric in relation to the transversal rotor rotation axis if the deflection electrode pairs on both sides of rotor rotation axis produce an equal but opposite moment to the rotor structure when using same voltage. The moment $M_e$ produced by electrical force in deflection electrodes can be described by $$M_e = \frac{1}{2} V^2 \frac{\partial C}{\partial \theta},$$

where V is voltage, C capacitance and $\theta$ displacement tilt angle.

The invention claimed is:

1. A capacitive micromechanical accelerometer comprising:
    a substrate which defines a substrate plane which extends in a transversal direction and a longitudinal direction, the transversal direction being perpendicular to the longitudinal direction,
    a first sensor for measuring acceleration along a vertical axis perpendicular to the substrate plane, and
    an accelerometer package with at least one inner package plane which is adjacent and parallel to the substrate plane,
    wherein
    the first sensor comprises a rotor which is mobile in relation to the substrate, a rotor suspender and one or more stators which are immobile in relation to the substrate,
    the rotor comprises one or more rotor electrodes and the one or more stators comprises one or more stator electrodes, the electrodes being configured for differential capacitive measurements,
    the rotor suspender comprises one or more transversal torsion springs attached to the rotor, wherein the torsion springs are aligned on a transversal rotor rotation axis,
    and wherein
    the rotor is a seesaw frame comprising at least a transversal rotor bar, a first longitudinal rotor bar attached to the transversal rotor bar and a second longitudinal rotor bar attached to the transversal rotor bar, and
    at least one longitudinal rotor bar comprises one or more first deflection electrodes, and a second deflection electrode is fixed to the inner package plane above or below each of the one or more first deflection electrodes, so that each of the one or more first deflection electrodes overlaps in an overlap area with the projection of the corresponding second deflection electrode in the substrate plane.

2. A capacitive micromechanical accelerometer according to claim 1, wherein the rotor is a two-sided seesaw frame.

3. A capacitive micromechanical accelerometer according to claim 2, wherein the one or more first deflection electrodes consist of one first deflection electrode on the first longitudinal rotor bar.

4. A capacitive micromechanical accelerometer according to claim 2, wherein the one or more first deflection electrodes consist of one first deflection electrode on the first longitudinal rotor bar and one first deflection electrode on the second longitudinal rotor bar.

5. A capacitive micromechanical accelerometer according to claim 4, wherein one of the first deflection electrodes is on a first side of the transversal rotor rotation axis, while the other is on the second side of the transversal rotor rotation axis.

6. A capacitive micromechanical accelerometer according to claim 2, wherein the one or more first deflection electrodes consist of two first deflection electrodes on the first longitudinal rotor bar and two first deflection electrodes on the second longitudinal rotor bar, and that one first deflection electrode on each longitudinal rotor bar is on a first side of the transversal rotor rotation axis, while the other is on a second side of the transversal rotor rotation axis.

7. A capacitive micromechanical accelerometer according to claim 2, wherein the one or more first deflection electrodes consist of two first deflection electrodes on either the first or the second longitudinal rotor bar, and that one first deflection electrode is on a first side of the transversal rotor rotation axis, and the other is on a second side of the transversal rotor rotation axis.

8. A capacitive micromechanical accelerometer according to claim 2, wherein the one or more first deflection electrodes consist of one first deflection electrode on the first longitudinal rotor bar and one first deflection electrode on the second longitudinal rotor bar, and that one of the first deflection electrodes is on a first side of the transversal rotor rotation axis, and the other is on a second side of the transversal rotor rotation axis.

9. A capacitive micromechanical accelerometer according to claim 2, wherein the first and second longitudinal rotor bars also comprise at least two first damping plates, and that second damping plates are fixed to the inner package plane above or below each of the one or more first damping plates, so that at least one first damping plate overlaps with the projection of a second damping plate to the substrate plane in a first overlap area on the first side of the transversal rotor rotation axis, and at least one first damping plate overlaps with the projection of a second damping plate to the substrate plane in a second overlap area on the second side of the transversal rotor rotation axis.

10. A capacitive micromechanical accelerometer according to claim 9, wherein the first overlap area is plane-symmetric with the second overlap area in relation to the vertical plane which includes the transversal rotor rotation axis.

11. A capacitive micromechanical accelerometer according to claim 1, wherein rotor is a one-sided seesaw frame.

12. A capacitive micromechanical accelerometer according to claim 11, wherein the one or more first deflection electrodes consist of one first deflection electrode on the first longitudinal rotor bar.

13. A capacitive micromechanical accelerometer according to claim 11, wherein the one or more first deflection electrodes consist of one first deflection electrode on the first longitudinal rotor bar and one first deflection electrode on the second longitudinal rotor bar.

14. A method for performing a self-test in an accelerometer according to claim 1, wherein an actuation force is applied to the rotor in the first sensor by applying a test voltage to at least one first deflection electrode and at least one second deflection electrode, and that a test response signal is read with a capacitive measurement from the rotor and stator electrodes.

* * * * *